Dec. 28, 1954     L. T. TEGLER     2,698,007
GRAVITY FLOW WATER HEATER
Filed March 31, 1950
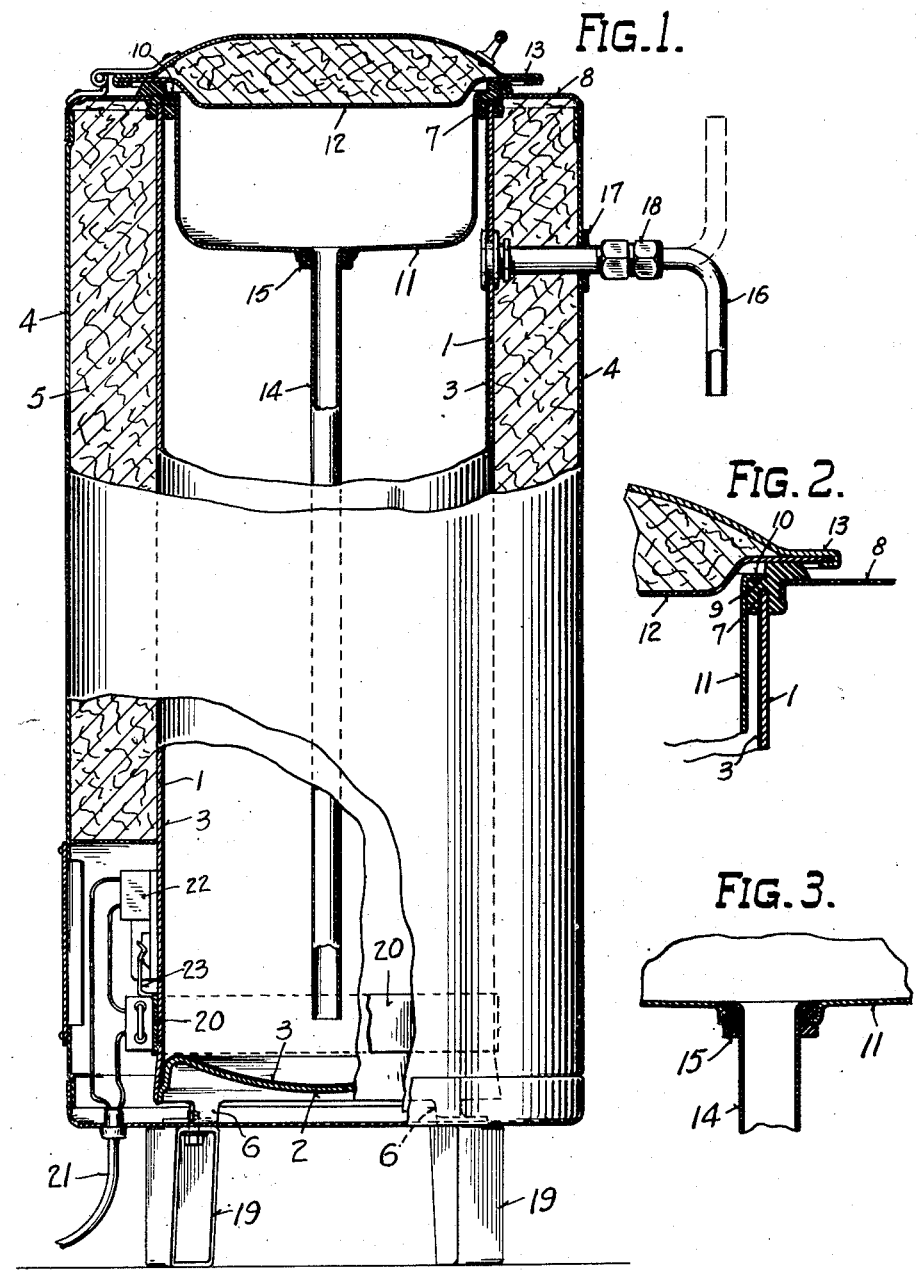
INVENTOR.
Laurence T. Tegler
BY
*Andrus + Sceales*
ATTORNEYS.

United States Patent Office 2,698,007
Patented Dec. 28, 1954

2,698,007

GRAVITY FLOW WATER HEATER

Laurence T. Tegler, Kankakee, Ill., assignor to A. O. Smith Corporation, Milwaukee, Wis., a corporation of New York Application March 31, 1950, Serial No. 153,231

2 Claims. (Cl. 122—13)

This invention relates to a water heater and more particularly has reference to a gravity type heater wherein discharge of heated water is obtained by adding water to the reservoir of the heater.

One object of the invention is to provide a heater which may readily be disassembled for cleaning.

Another object is to provide a heater assembly at decreased expense and wherein the steam and vapors from the heated water are prevented from coming in contact with the insulation and mechanism of the heater yet with access readily available to the inside of the heater tank for cleaning purposes.

The invention is shown as applied to a water heater in which gravity discharge of hot water is obtained by adding cold water to the reservoir of the heater. In general, the heater shown comprises an enamel lined inner tank spaced from an outer casing by insulating material. The upper end of the tank is closed by a pan or reservoir having a cover which is sealed to the upper end of the tank by a gasket of suitable rubber or the like and shaped to prevent ready removal of the pan and yet seal off escape of hot vapors from the inside of the tank to the insulation material or to other mechanism inside the heater unit. Water poured into the pan enters the tank through a tube extending to the bottom of the tank from the pan or reservoir and the tube is supported within the latter for ready removal by an H-ring shaped gasket of rubber or the like. Discharge of hot water is obtained through a spout extending from near the upper end of the tank and through the side wall of the casing of the heater, the spout being rotatable to control the discharge of water. The water of the tank is shown as heated by a wrap-around heating element controlled by a disk-like thermostat resting on the wall of the tank.

Other objects of the invention will appear hereinafter from the following description of the drawings illustrating an embodiment of the invention;

In the drawings

Figure 1 is a longitudinal sectional view of a heater illustrating the invention with parts in elevation;

Fig. 2 is a detailed view illustrating the sealing gasket between the tank and reservoir; and Fig. 3 is a detail view of the joint between the reservoir and its discharge tube.

The drawing illustrates a water heater comprising an inner tank formed of a generally cylindrical shell 1 which is closed at the bottom by a head 2 of convex concave shape welded thereto at the joint therebetween. The inner wall of the shell and head are coated with ceramic enamel 3 or the like to protect the same from corrosion by contained fluid. The shell and head 2 are spaced from an outer enclosing casing 4 by heat insulating material 5 and the tank is secured to the bottom of casing 4 by brackets 6 which space the tank from the casing.

The upper end of shell 1 is encircled by a gasket 7 which is grooved to fit over the end of the shell. The upper portion of gasket 7 is flanged outwardly to provide an abutment which rests upon the upper closure ring 8 of the casing shown as a separate piece but which may be provided as a part of the casing itself. The outer portion of ring 8 is flanged downwardly and overlies the body of the casing which is crimped circumferentially to receive closure 8 for a tight fit therebetween.

The inner portion of gasket 7 is formed to provide a ledge 9 upon which rests the flange 10 of the pan or reservoir 11. The pan has considerable depth, and extends within shell 1 for a substantial distance, to receive the water which is poured or discharged therein for flow into the heater unit. Pan 11 also operates as a closure for the upper end of shell 1 of the heater storage tank. When pan 11 is received by ledge 9 of gasket 7 the upper end of shell 1 is closed and steam and vapors cannot escape from inside the tank.

The top of pan 11 is closed by a cover 12 formed of two opposed pan shaped disks which have disposed therebetween insulating material corresponding to material 5 previously described. The cover has a peripheral flange 13 which rests on the top of gasket 7 and overlies closure ring 8 of the casing. The cover and gasket 7 effectively seal off reservoir 11.

The reservoir has a central discharge opening which communicates with a tube 14 for discharge of water from the reservoir to the bottom of the heater tank. The upper flared end of tube 14 is surrounded by a gasket 15 of suitable rubber or the like which has an outer circumferential groove to receive a lateral flange on the depressed edge surrounding the discharge hole and supports the tube from the pan and seals the joint therebetween.

Discharge from the heater is effected by the pipe or spout 16 which extends from the inside of the tank directly beneath pan 11 to the outside of the heater through insulation 5 and a hole in casing 4, the hole being sealed by a suitable rubber gasket 17.

A swivel joint 18 in pipe 16 immediately removed from casing 4 permits the spout of pipe 16 to be rotated by the operator so that when rotated upwardly no water is discharged even through there is water in the reservoir. When the spout of the discharge pipe 16 is rotated downwardly water will be discharged due to water present in the pan 11 or upon flow of water into the pan.

The heater unit is supported from the floor by legs 19 which are suitably secured to the lower head of the casing as by bolting to brackets 6.

Heat for the unit shown is provided by wrap-around heating element 20 assembled on the inner tank near the bottom thereof. The element is connected to a source of electric current not shown, by cord 21 which extends through the bottom of the casing and is controlled by thermostat 22 of disc-like shape secured against the wall of shell 1 near element 20 by mounting brackets 23.

By employing gasket 7 of the shape described pan or reservoir 11 can be readily removed carrying with it the water inlet tube 14 which itself is readily withdrawn from pan 11 due to gasket 15. Gasket 7 prevents vapors from reaching insulation 5 or passing through the heater to heating element 20 or to other parts. The construction necessitates the permanent securing together of only the lower head and shell.

Various embodiments of the invention may be employed within the scope of the accompanying claims.

I claim:

1. A gravity type water heater comprising an inner tank having a generally cylindrical metal shell closed at the bottom by a metal head member sealed to said shell to contain liquid within said tank, a metal casing surrounding said tank and spaced therefrom by heat insulating material, an annular ring extending across the top of the insulating material with the outer edge portion of the ring being downwardly flanged and overlying the upper end of the casing with a slip joint connection between the ring and casing and with the inner edge portion of the ring being downwardly flanged and disposed radially outside the upper end of the tank and spaced therefrom, a heat resistant vertically grooved annular gasket fitting over the upper end of the tank with a portion of the gasket being disposed radially outside the end of the tank and having a generally annular ledge for receiving the inner flange of said ring with the portion of the gasket above said ledge overlapping the top of said ring and defining a seat and another portion of the gasket being disposed radially inside the end of the tank and having a generally annular ledge thereon, a metal closure pan for said tank extending within the tank for a substantial distance and having a flanged central opening and a generally annular flange on the upper end resting freely on said last named ledge of the gasket and with the body of the pan spaced inwardly of the wall of the tank, a removable insulated cover adapted to rest on said seat to close off the pan, a heat insulating gasket having a central peripheral groove receiving the flange around the opening in the closure pan, a metal inlet tube extending from the closure pan to substantially the bottom of the tank for inlet of cold water and having a flange on its upper end resting on the gasket around the central opening in the pan closure, means to heat the water stored in the tank, and conduit means leading from the upper portion of the tank and insulated from the casing of the tank to carry off hot water when cold water is added to the tank through the closure pan and inlet tube, the gasket between the annular ring and tank and the gasket between the inlet tube and pan preventing escape of heat from the stored water and the gasket between the annular ring and tank preventing passage of moisture to the insulation.

2. A gravity type water heater comprising an inner tank having a generally cylindrical metal shell closed at the bottom by a metal head member sealed to said shell to contain liquid within the tank, a metal casing surrounding the tank and spaced therefrom by heat insulating material, an annular ring extending across the top of the insulating material with the outer peripheral edge of the ring being connected to said casing and with the inner edge of said annular ring being spaced from said tank, an annular heat resistant resilient gasket having a vertical groove disposed to receive the upper edge of said tank and having an annular recess on the outer periphery thereof to receive the inner edge of said ring and the portion of said gasket above said annular recess overlapping said ring and defining a generally annular seat, the inner edge portion of said annular gasket being provided with a generally annular ledge thereon, a closure pan for said tank extending a substantial distance within the tank and having an annular flange on the upper end thereof, said flange being adapted to rest on said ledge with the body of the pan spaced inwardly of the wall of the tank, a water inlet tube extending within an opening in said pan for introducing water into said tank, a removable cover member adapted to rest on said seat and close off the pan, means to heat the water stored in the tank, and a discharge member communicating with the upper portion of said tank beneath said pan for discharging heater water from the tank when water is added to said tank through said pan and said inlet tube.

References Cited in the file of this patent

UNITED STATES PATENTS

| Number | Name | Date |
|---|---|---|
| 1,269,052 | Clark et al. | June 11, 1918 |
| 1,619,967 | Bontempi | Mar. 8, 1927 |
| 1,862,153 | Lee | June 7, 1932 |
| 2,269,448 | Ferris | Jan. 13, 1942 |
| 2,299,053 | Ferris | Oct. 13, 1942 |
| 2,367,409 | Kuhler | Jan. 16, 1945 |
| 2,395,602 | Wittenberg | Feb. 26, 1946 |
| 2,396,078 | Box | Mar. 5, 1946 |
| 2,422,492 | Losee | Jan. 17, 1947 |
| 2,467,749 | Hodsdon | Apr. 19, 1949 |